United States Patent [19]

Laing

[11] Patent Number: 4,471,253

[45] Date of Patent: Sep. 11, 1984

[54] STATOR FOR BALL MOTORS

[76] Inventor: Karsten Laing, Kaiserallee 51, D7148 Remseck a.N.2, Fed. Rep. of Germany

[21] Appl. No.: 397,085

[22] Filed: Jul. 12, 1982

[51] Int. Cl.³ .............................................. H02K 1/06
[52] U.S. Cl. .................................... 310/217; 310/166; 310/259
[58] Field of Search ............... 310/157, 166, 216, 217, 310/218, 193, 42, 254, 258, 259; 336/212, 210, 216, 234; 29/596

[56] References Cited

U.S. PATENT DOCUMENTS 2,490,021 12/1949 Aske.
2,734,140 2/1956 Parker.
3,581,132 5/1971 Laing .................. 310/166
3,732,445 5/1973 Laing .................. 310/166
3,814,963 6/1974 Laing .................. 310/166
4,051,401 9/1977 Hayward ............. 310/166

FOREIGN PATENT DOCUMENTS 889935 9/1953 Fed. Rep. of Germany.
2151598 4/1973 Fed. Rep. of Germany.
211546 9/1940 Switzerland.

Primary Examiner—R. Skudy
Attorney, Agent, or Firm—Pennie & Edmonds

[57] ABSTRACT

Without exception, the iron sheets of the stator teeth of electric motors are up to now produced by stamping. The invention relates to electric motors in which the stack of iron sheets of the stator is largely composed of rectangular metal sheet strips cut from a strip.

6 Claims, 11 Drawing Figures

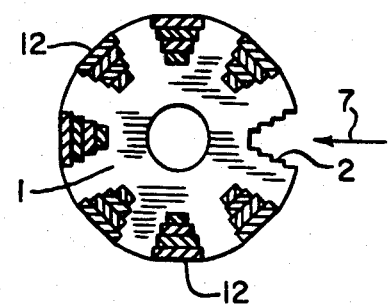
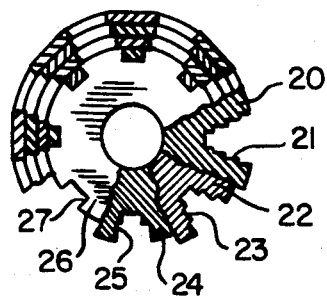
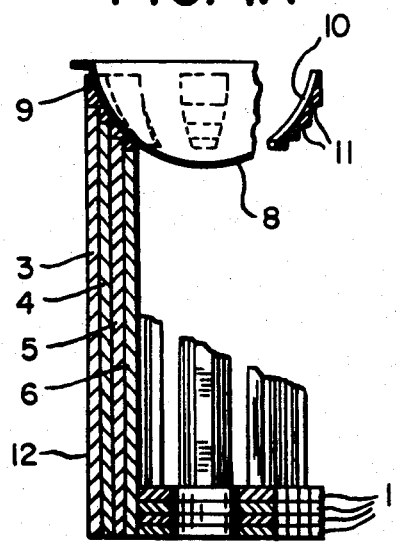
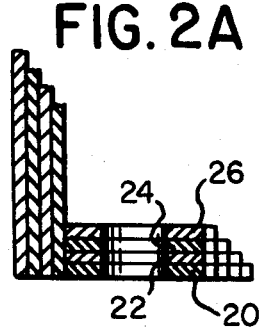
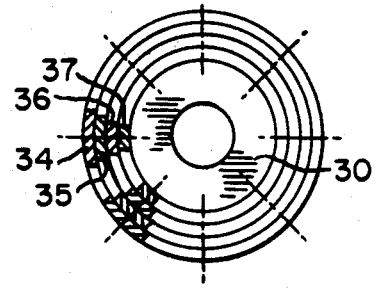
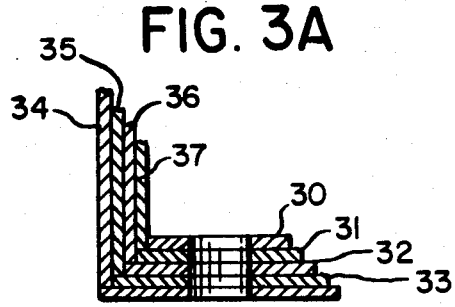

STATOR FOR BALL MOTORS

The invention relates to a stator for ball motors the stator teeth of which consist of strips of a metal sheet.

Ball rotors of spherical type electric motors are characterised by the fact that the rotor is magnetically supported and stabilised and are increasingly gaining in significance. The teeth of such as motor are formed by sheet metal strips which are positioned to extend either radially, that is to say which enclose triangular air spaces between them, and which end at the surface of the spherical air gap and thus require the ends of the strips to be appropriately shaped or they form projections of a spirally wound sheet metal coil which extends in the circumferential direction. Both embodiments require the use of complicated stamping tools to impart the required shape to the strips or to the coil. Embodiments wound in the shape of a spiral coil also necessitate the ends of the coil projections be ground to a contour complimentary in shape to the air gap. The sheet metal wastage for both embodiments is about 40%.

The invention relates to stators with teeth which are not subject to these disadvantages. According to the invention, the teeth extend radially to and parallel to the axis of rotation of the rotor where each tooth comprises a plurality of individual rectangular shaped adjacent strips where the width of adjacent strips decreases radially inwardly towards the center of the stator. This makes it possible to cut the strips of sheet metal required for the teeth from an endless strip without wastage. The magnetic return path is provided via discs yokes which have stepped recesses and thus create a continuous magnetic transition from the strips of sheet metal with different extent and length in azimuth to the magnetic air gap.

Thus the invention consists in that rectangular strips of sheet metal which have been produced by wasteless shearing and which have different widths and lengths are combined to form teeth and are joined to each other at one end by means of sheet metal discs having stepped recesses and at the other end terminate near the surface of the spherical magnetic gap. Accordingly, the strips of sheet metal have increasingly greater widths and greater lengths, when viewed radially outwardly from the center of the stator. In order to match the sheet metal parts to the spherical shape, the ends of the strips can have bevels produced by rolling or connect at their ends to pole shoes having a stepped surface.

The invention will be described with the aid of figures, in which:

FIG. 1 is a plan sectional view of a stator constructed according to the invention;

FIG. 1A is a side sectional view of the stator of FIG. 1;

FIG. 2 is a plan sectional view of a further form of a stator constructed according to the invention having return path elements or yokes of decreasing diameter;

FIG. 2A is a side sectional view of a portion of the stator of FIG. 2;

FIG. 3 is a plan sectional view of a still further form of a stator constructed according to the invention;

FIG. 3A is a side sectional view of the stator of FIG. 3;

Figure 4:
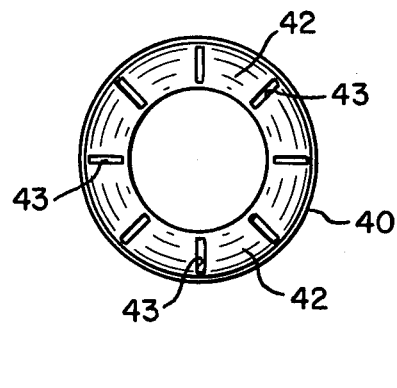
FIG. 4 is a plan view of a pole shoe element in the form of a ring.

FIG. 1 shows the plan view and longitudinal section of a stator according to the invention having a plurality of teeth 12 which extend radially and parallel with respect to the center line of the stator. The return-path individual rectangular shaped strips 1 have stepped recesses 2 into which the strips 3, 4, 5 and 6 have been pressed in accordance with the direction of the arrow 7 to form a stator tooth 12. As shown, the strips of each tooth decrease in width in a direction radially inwardly of the center line of the stator. Each tooth is is connected at one end to an isolating cap 8 by a pole shoe 9 of soft iron the concave surface 10 of which follows the cap 8 whereas the convex surface 11 is constructed to be stepped to conform to the stepped ends of the strips 3–6.

FIG. 2 and FIG. 2A shows a different form of the return-path sheets 20, 22, 24 and 26 which have decreasing diameters so that the return-path sheet 20, which can also consist of a plurality of thinner sheets, has 4 steps 21 whereas the return-path sheet 22 has only 3 steps, the return-path sheet 24 has only 2 steps 25 and return path sheet 26 has only 1 step 27.

FIG. 3 and FIG. 3A shows a similar arrangement in which the return-path sheets 30, 31, 32 and 33 are constructed to be circularly cylindrical and the strips 34, 35, 36 and 37 are bent along their width in such a way that they follow the contour of the return-path discs 30, 31, 32 and 33.

Figure 4A:
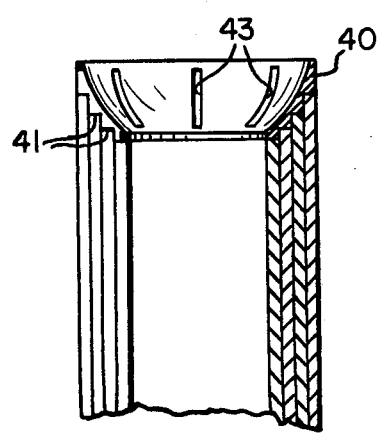
FIG. 4A is a side sectional view of the pole shoe element of FIG. 4 applied to a stator.

FIG. 4 and FIG. 4A shows a pole shoe element in which all pole shoes are formed of a ring 40 in which, on its convex side, steps 41 are arranged, for example by turning, in which arrangement the poles 42 are separated from one another by radial slots 43.

Figure 5:
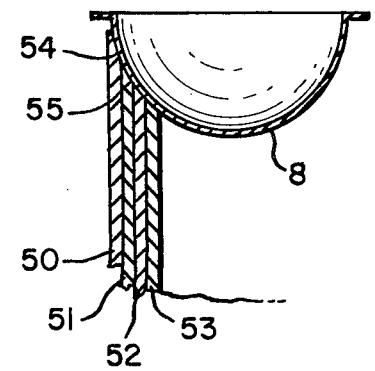
FIG. 5 is a partial side sectional view of a stator constructed according to the invention in which the ends of strips forming a stator tooth are beveled.

FIG. 5 shows an embodiment in which the steel-plate strips 50, 51, 52, and 53 at their ends facing the cap 8 have bevels which largely follow the contour of the cap. These bevels 54 and 55 can be generated by oblique shearing but they can also be produced by rolling in which case the inclined surfaces then will be located on circular arcs, seen in cross-section.

Figures 6, 6A:
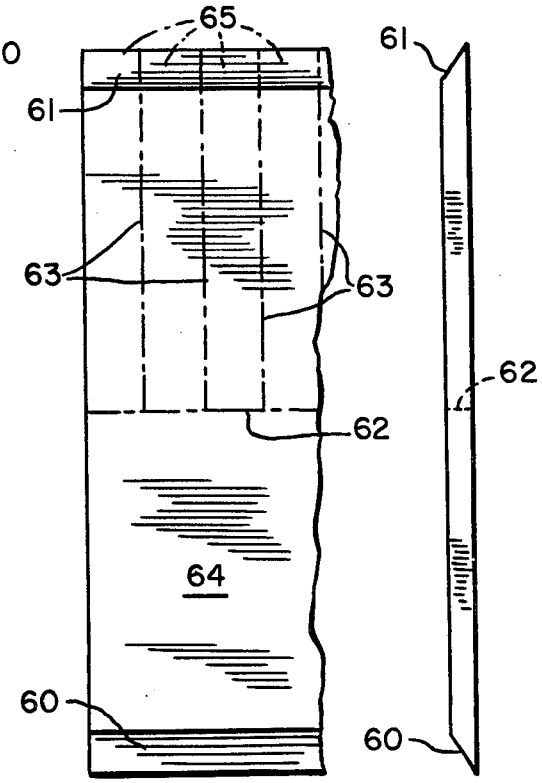
FIG. 6 is a plan view of a sheet of material illustrating the dimensions of individual strips sheared from the sheet; and, FIG. 6A is a side edge view of a strip sheared from the sheet of FIG. 6.

FIG. 6A shows a sheet metal strip which is shown with exaggerated thickness and in which the bevels 60 and 61 have been generated by rolling. FIG. 6 shows that cutting a sheet of strip material 64 along the cutting line 62 produces two strips which are then cut apart along the markings 63 to form a plurality of rectangular individual strips 65.

I claim:

1. A stator for a spherical rotor type electric motor where a spherical air gap separates the rotor from the stator, said stator comprising a plurality of stator teeth extending radially and parallel to the center line of the stator, each of said teeth having a plurality of individual rectangular shaped adjacent sheet metal strips where adjacent strips contact each other on oppositely facing surfaces along the length of the strips and where the widths and lengths of said adjacent strips decrease radially inwardly towards the center of the stator wherein the ends of the teeth facing the air gap are connected to pole shoes each of which has a concave spherical surface complementary to the spherical air gap on one side thereof and a stepped configuration on an opposite side thereof to contact the ends of the strips of each of said teeth.

2. A stator according to claim 1 wherein all the pole shoes are included in a single pole ring with adjacent pole shoes being separated by a slot in the ring.

3. A stator according to claim 1 wherein the ends of the strips facing the air gap are beveled to substantially form a concave spherical surface complementary to the spherical air gap.

4. A stator according to claim 1 wherein the ends of each of the strips opposite the ends facing the air gap contacts a return path yoke on at least two edges of the strip.

5. A stator according to claim 4 including a plurality of adjacent return path yokes and wherein the diameter of a return path yoke closer to said ends facing the air gap is less than the diameter of a return path yoke further from said ends facing said air gap.

6. A stator according to claim 1 wherein each said strip is slightly bent along its width to conform to the periphery of said stator.

* * * * *